UNITED STATES PATENT OFFICE.

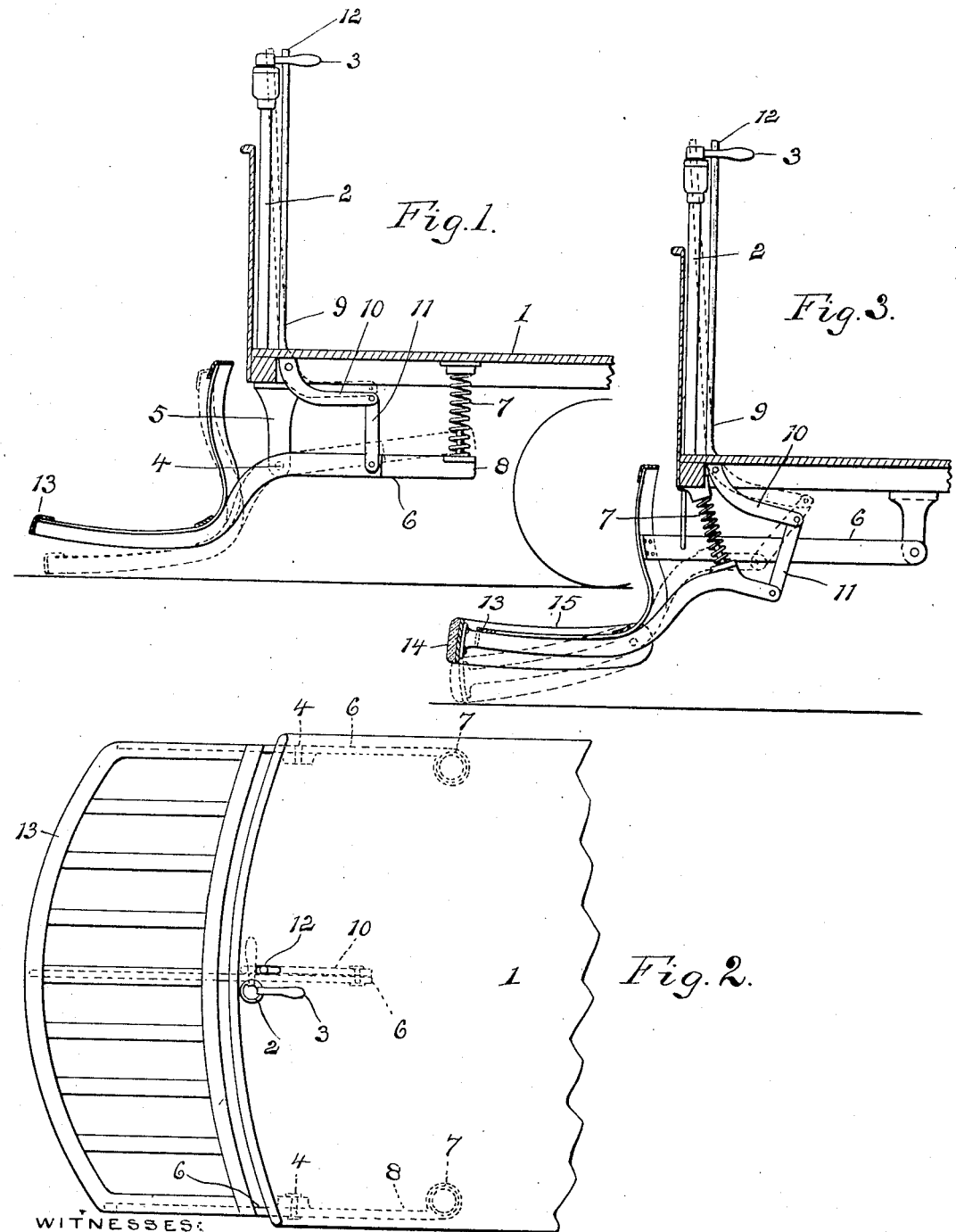

AUGUSTUS W. SHANK, OF DETROIT, MICHIGAN, ASSIGNOR OF ONE-FOURTH TO OSCAR PLANT, ONE-FOURTH TO FRED MOHN, ONE-EIGHTH TO ERNEST W. BATTISHILL, AND ONE-EIGHTH TO OTTO WACHSMANN, ALL OF DETROIT, MICHIGAN.

CAR-FENDER.

No. 882,506.

Specification of Letters Patent.

Patented March 17, 1908.

Application filed June 19, 1907. Serial No. 379,728.

*To all whom it may concern:*

Be it known that I, AUGUSTUS W. SHANK, a citizen of the United States of America, residing at Detroit, in the county of Wayne and State of Michigan, have invented certain new and useful Improvements in Car-Fenders, of which the following is a specification, reference being had therein to the accompanying drawings.

Street car fenders are usually hung at an interval above the track and are adapted to be tripped or released by the motorman when an object is encountered, so as to fall of their own weight onto the rails or pavement, or they are provided with means automatically lowering them when they strike an obstacle.

This invention relates to a car fender which is normally clear of the track and is positively moved down by the motorman so as to slide on the track or pavement when the emergency brake is applied.

The invention consists in the matters hereinafter set forth, and more particularly pointed out in the appended claims.

As herein illustrated, the device is shown mounted on a car equipped with a standard air brake system.

In the drawings, Figure 1 is a view in elevation of the forward end of a car equipped with a fender embodying the features of the invention, showing the fender in normal position. Fig. 2 is a plan view of the fender. Fig. 3 is a view of a modified form of the device.

Referring to the drawings, 1 represents the forward end or platform of a car having the usual brake stand 2 in which an air-brake handle 3 is operatively secured. This handle controls the usual three-way valve so that when thrown around to the extreme position shown by the dotted outline, the emergency brake of the car is applied.

A fender of the usual openwork construction is horizontally balanced or pivoted by pivot pins 4 on hangers 5 secured to the car body, its longitudinal frame members 6 constituting levers of the first class whose forward arms carry the major part of the weight of the fender. Springs 7 in compression between the rear arms 8 of the levers and the car body counterbalance the weight of the fender and maintain the fender in its normal position. A counterbalance weight may also be used in place of the springs. A bent or bell crank lever 9 is pivoted or fulcrumed on the car platform near the base of the brake stand, and projects through an aperture in the platform. Its lower arm 10 extends back parallel to the lever 8 to which it is operatively connected by a link 11. The upper end 12 of the lever is adapted to be engaged by the air-brake handle 3 when the latter is being turned to apply the emergency brake, and the parts are so disposed and arranged that the front bar 13 of the fender is close to or riding on the rails when the air is applied. Upon the release of the air, the counterbalance returns the fender to place.

When a standard fender of approved design is already attached to a car, a modified form of this invention may be applied as shown in Fig. 3, consisting merely of the front bow 14 and side members 15 which extend around the main fender and are pivoted to the car and counterbalanced and operated as before. In such case, it is preferable that the bow be made of frangible material, such as a strip of wood or the like, suitably padded, which will not injure a person, but will act as a buffer when a wagon or the like is hit, and that will yield and break, if necessary, and thus shield the main body of the fender from permanent injury, the bow being readily removed and replaced, as it is light and simple in structure.

When an object or person suddenly appears on the track close to a car, the first, almost instinctive movement of the motorman is to apply the emergency and to shut off the power. As his hands are always on the controller or throttle and on the brake handle, his first action lowers the fender so that there is no possibility of the fender riding upon and injuring the obstacle or person.

The fender is ordinarily out of the way and does not interfere or load the ordinary controlling devices of the car and does not require an unusual or extra motion or action of the motorman to set it. In cable cars or the like, where an emergency friction brake is used, the device may be adjusted to be operated by the emergency lever. The frame may be tilted forward by proper connection with means operated by compressed air which is controlled by the emergency brake lever in unison with the air brake system itself.

Obviously, the design and details of construction may be varied without departing from the spirit of the invention, and I do not care to limit myself to any particular form or arrangement of parts.

What I claim as my invention is:—

1. In a car having a manually controlled brake, the combination with a manually operated lever controlling the brake, of a normally horizontal counterbalanced frame pivotally supported at the forward end of the car, a lever, whose load arm is substantially parallel to the frame and whose power arm is operatively engaged by said member when the brake is applied, and a link articulating the rear end of the frame and the load arm of the lever.

2. In a car having a brake and a manually operated lever, adapted to control the brake, pivoted on the car front within reach of the operator, a normally horizontal counterbalanced fender pivotally supported at the forward end of the car, and a lever adapted to tilt the fender forward, fulcrumed on the car, whose load arm is coupled by a link to the rear of the fender, and whose power arm passes through the plane of rotation of the brake lever, and is engaged by said brake lever when the brake is applied.

3. In a car having a manually operated brake controlling lever, a fender pivotally supported at the forward end of the car above the car track, counterbalancing means adapted to hold the fender normally in a horizontal position, a lever operatively engaged by the brake lever when the brake is applied, pivoted to the car, articulated to the fender and adapted to tilt the fender forward when engaged by the brake lever.

4. In a car having a manually operated brake controlling lever mounted on the car platform in reach of the operator, a fender pivotally supported between its ends in a normally horizontal position below the platform and above the track, a bell crank lever pivoted to the platform whose horizontal arm is substantially parallel to the fender and whose upright arm lies in the path of the brake lever and is depressed thereby when the brake is applied, and a link articulating the end of the horizontal arm and the rear of the fender.

5. In a car having an upright brake-stand on the forward platform, a manually operated brake-controlling lever pivoted thereon, the combination with said stand and lever of a fender whose longitudinal members are pivotally supported between their ends beneath the car above the track, with their rear portions extending beneath the platform, a counterbalance engaging the fender in rear of the pivot support adapted to maintain it normally in a horizontal position, a bell-crank lever pivoted near the base of the stand, extending through the platform, whose lower rearward arm below the platform is substantially parallel to the longitudinal fender members, and whose upright arm is engaged and thrown forward by the brake controlling lever when the brake is applied, and a rigid link articulating the end of the lower arm and the rear end of the fender, adapted to return the lever to its initial position through the medium of the counterbalance, when the brake is released by return of the hand lever.

6. In a car having a brake, manually operated means for controlling it, and a fender whose lower margin is at an interval above the track, an auxiliary fender comprising a bow of resilient, frangible material, conforming substantially to the fender margin, supported by side members pivoted beneath the car, adapted to close the interval when tilted forward, and means to tilt the frame operated by the brake controlling means.

7. In a car having a brake, a manually operated lever for controlling it, and a main fender whose lower margin is at an interval above the track, an auxiliary fender comprising a bow of resilient, frangible material conforming substantially to the fender margin rotatably supported side members secured to the bow, and a counterbalance member adapted to normally maintain said bow in substantially horizontal alinement with the margin, and a link-and-lever connection between the side members and brake-controlling lever adapted to swing the bar into the interval between the main fender margin and track when the brake lever is moved to set the brake.

In testimony whereof I affix my signature in presence of two witnesses.

AUGUSTUS W. SHANK.

Witnesses:
C. R. STICKNEY,
OTTO F. BARTHEL